Feb. 5, 1929.
C. A. NORGREN
1,701,162
AIR CHUCK
Filed Feb. 1, 1927
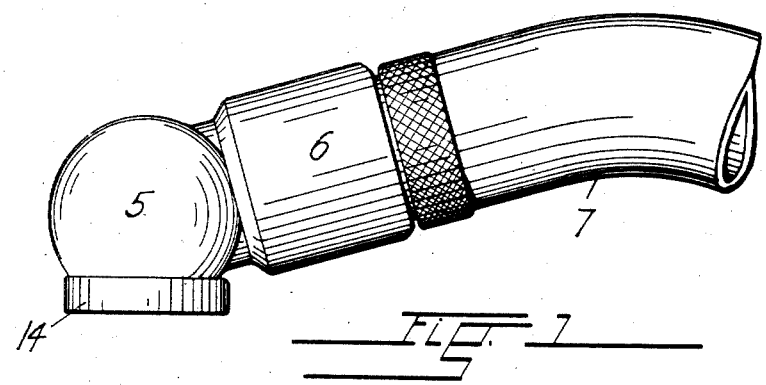
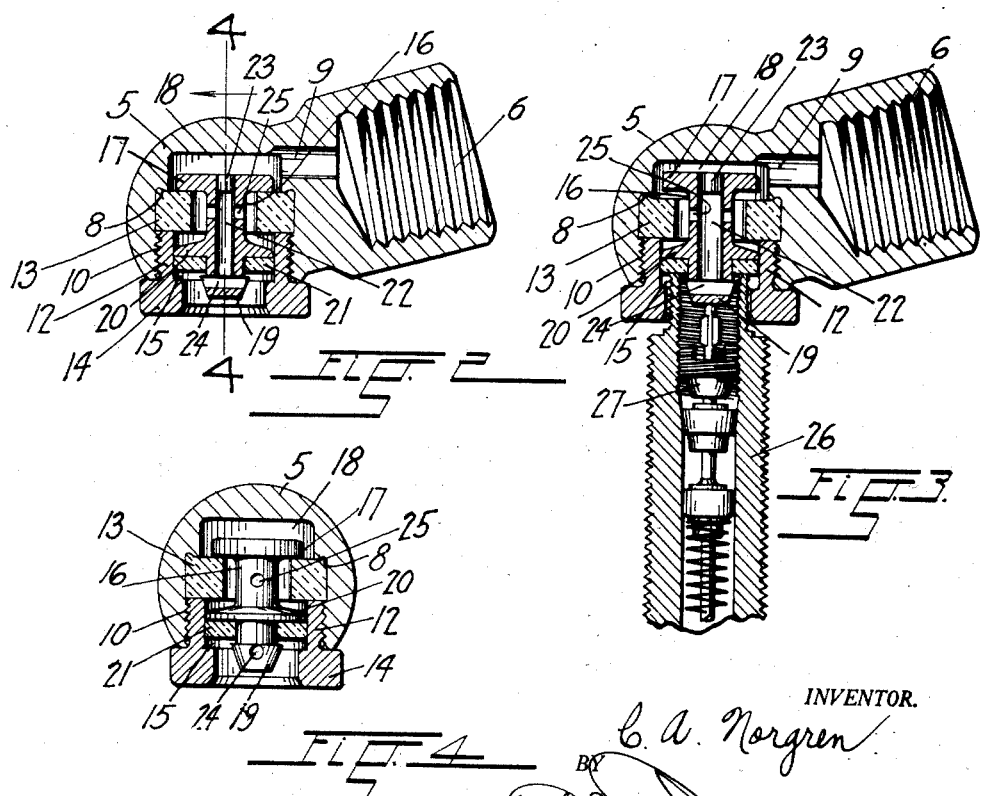
INVENTOR.
C. A. Norgren
BY
ATTORNEY.

Patented Feb. 5, 1929.

1,701,162

UNITED STATES PATENT OFFICE.

CARL A. NORGREN, OF DENVER, COLORADO.

AIR CHUCK.

Application filed February 1, 1927. Serial No. 165,125.

This invention relates to air chucks of the type used for connecting the nipples of pneumatic wheel-tires with a source of air under pressure for inflation of the tires at service stations and garages.

The invention relates more particularly to improvements in air-chucks of the character shown and described in my United States Patent, No. 1,613,527, issued January 4, 1927, it being an object of the improvements to provide an air chuck capable of delivering air to the tire stem with the minimum of obstruction and resistance and without the detrimental leakage occurring in the majority of air-chucks at present in use.

A further object of the invention resides in the provision of a chuck which by the proper disposition of a case-hardened part at the point most liable to wear and break, is secured against incapacitation by rough and frequent usage and abuse.

A further object of this invention is to provide an arrangement of a valve and sealing washer which admits of the use of a much harder and tougher material than can ordinarily be used, thus insuring longer life of the washer and materially decreasing the cost and inconvenience of replacement; also by such arrangement of the washer and valve to eliminate any possibility of said washer becoming, through decay or wear, an obstruction to offer resistance to the free flow of the air through the chuck and into the tire.

Other objects of the invention will be found in the course of the following description and in the accompanying drawings forming part of the specification.

In the drawings in the several views of which like parts are similarly designated, Figure 1 represents a side elevation of the improved chuck in connection with an air-hose, Figure 2, a sectional elevation of the chuck, showing its valve in the normal position when the chuck is not in use, Figure 3, a view similar to Figure 2, showing the valve of the chuck in the open position to which it is moved by the application of the chuck to the nipple of a pneumatic tire, and Figure 4, a section taken on the line 4—4 in Figure 2, showing the valve of the chuck in elevation.

Referring further to the drawings, the chuck comprises a preferably globular body 5 provided with a screw-threaded socket 6 for its attachment to a service-hose 7 connected with a conveniently located source of air under pressure. The body 5 has a cylindrical chamber shouldered as at 8 and connected at its inner end with the socket 6 by means of a port 9.

The outer portion of the chamber is screw-threaded as at 10 for the application of a case hardened steel screw-gland 12. The gland bears against an annular gasket 13 of rubber or other resilient material which rests against the shoulder in the chamber of the body 5, and which in the operation of the device performs the functions of a valve-seat and a cushioning stop as will hereinafter be more fully described.

The shoulder may be beveled to better secure the gasket against displacement under pressure.

The steel gland has a heavy flange 14 resting against the body of the chuck and providing a shield which protects the chuck against injury or breakage by contact with the pavement or other objects, or generally by the rough and careless usage to which it is usually subjected at public filling stations and garages.

The gland is hollow and it has interiorly, a shoulder 15 opposed to the inwardly projecting portion of the annular gasket 13 to provide a chamber for the restricted movement of the valve which controls the passage of air from the chuck. The valve consists of a cylindrical shank 16 passing freely through the resilient gasket and having at one end a head 17 which is disposed in the space 18 between the gasket and the inner end of the body-chamber at which it is connected with the socket 6.

The opposite end of the valve-shank has a conoidally shaped knob or knob portion 19 in spaced relation to a flange 20 which fits slidingly within the chamber of the gland. A resilient washer 21 fitting snugly around the shank of the valve between the knob 19 and the flange 20 provides a cushioning abutment for the tire-nipple and functions as a seal to prevent the escape of air from the chuck around the nipple.

The valve has an axial bore 22 which is closed at its headed end by means of a plug 23 and which at its opposite end extends to a transverse duct 24 in the knob portion 19. A second transverse duct 25 connects with the bore of the valve between the flange and the head thereof so that when the head is separated from the seat provided by the resilient gasket 13, there will be an unobstructed passage of air between the socket of the chuck body and the outer portion of the gland-chamber into which, in practice, the end of the tire-nipple is inserted.

The flange 20 is beveled at its face opposed to the resilient gasket to insure of its air-tight contact therewith when the valve is in the open position for the delivery of the air supplied through the hose 7 to the nipple of the tire.

When the chuck is not in use the head 17 of the valve is pressed against the resilient seat provided by the gasket and thereby seals the chuck against the escape of air.

To admit the air to a pneumatic tire the nipple 26 thereof is inserted in the hollow gland to engage with the sealing washer on the end of the chuck valve which thereby is separated from its seat. The engagement of the flange 20 with the resilient gasket and the compression of the washer 21 within the gland-chamber prevents the leakage of air around the valve so that all of the air must pass through the bore of the valve by its connection with the transverse ducts 24 and 25.

The contact between the resilient washer and the inner end of the valve-nipple, prevents the escape of air exteriorly of the latter and the slight movement of the nipple relative to the chuck valve causes the latter to open the tire valve 27 thereby completing the communication between the source of air-supply and the interior of the tire.

After the tire has been inflated to the desired degree the nipple is withdrawn from the chuck which causes the valve-head to be moved to its normal position in air-tight engagement with its resilient seat by the pressure of the air entering the space at the inner end of the chuck-chamber through the port 9.

It is a distinctive feature of the present invention that the engagement of the chuck-valve and the tire valve does in no way obstruct the flow of air, because the egress opening through which the air passes into the tire-nipple is away from the end of the chuck valve by which the tire-valve is engaged.

It will further be observed that the resilient gasket seals the valve againt leakage when the chuck is not in use as well as when it is applied to the tire-nipple, and that the washer moving with the valve has its edges protected by the shoulder in the gland and the shoulder of the conoidal knob 19, and is adapted to seal the end of the tire-nipple without the excessive pressure, abrasion or flexing required in chucks in which the washer is stationary.

In fact, both the gasket and the washer perform their functions under slight pressure and without being flexed in the ordinary sense of the word and they will therefore retain their efficiency for a much longer period than washers which for their effective action depend upon a partial displacement under comparatively heavy pressure.

The advantages of the case-hardened steel gland have hereinbefore been pointed out and it will be evident that the improved chuck possesses all the characteristics necessary to insure against leakage and waste of air, to prolong the life of its parts far beyond that of other chucks at present in use and to facilitate its application and operation in delivering air under pressure to pneumatic tires and other contrivances.

Having thus described my invention, what I claim and desire to secure by Letters Patent is:—

1. An air chuck comprising a body having a valve-chamber, a resilient annular gasket in the chamber and a valve having a head and a beveled flange at opposite sides of the gasket, and an enlarged knob portion beyond the flange and adapted to be moved relative to the gasket by contact of a tire-nipple, the valve having an internal duct for the passage of air to a tire-nipple with which it engages, said valve having a packing means between the flange and the knob portion and located thereby in said chamber.

2. An air chuck comprising a body having a valve-chamber, a resilient annular gasket in the chamber, and a valve provided with a shank portion within the gasket, with a head and a flange at opposite sides of the gasket, with an enlarged knob portion beyond the flange, and with an internal passage having its ingress-opening in the shank-portion and its egress opening in the knob portion, and a floating washer on the valve between the flange and the knob portion, the valve being movable relative to the gasket by contact of a tire-nipple with the washer.

3. An air chuck comprising a body having a valve chamber, a resilient annular gasket in the chamber, a valve provided with a shank portion within the gasket, with a head and a flange at opposite sides of the gasket, with an enlarged knob portion beyond the flange, and with an internal passage having its ingress opening in the shank portion and its egress opening in the knob portion, and a washer on the valve between the flange and the knob portion, the washer being movable with the valve to maintain engagement with the flange after the head is removed from the gasket by a tire nipple engaging the washer.

In testimony whereof I have affixed my signature.

CARL A. NORGREN.